Figure 1:
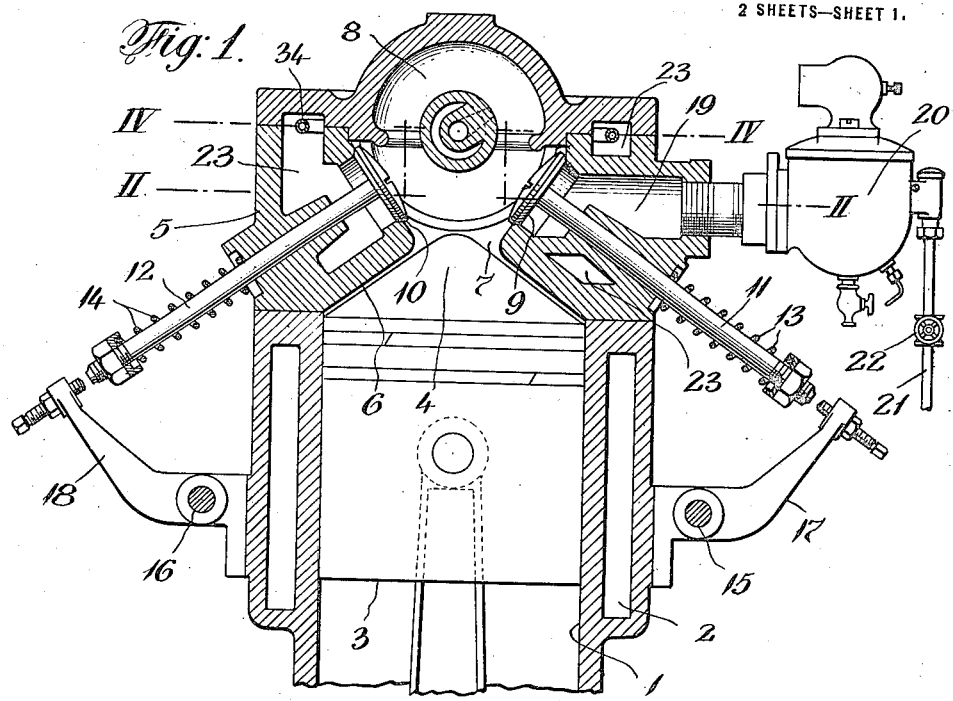

M. CARBONE.
INTERNAL COMBUSTION ENGINE.
APPLICATION FILED NOV. 11, 1913.

1,205,158.

Patented Nov. 21, 1916.
2 SHEETS—SHEET 1.

Witnesses:
John J. Kittel
L. Gonzad Nandre

Inventor
Mario Carbone
By his Attorney
Charles H. Wilson

M. CARBONE.
INTERNAL COMBUSTION ENGINE.
APPLICATION FILED NOV. 11, 1913.
1,205,158.
Patented Nov. 21, 1916.
2 SHEETS—SHEET 2.
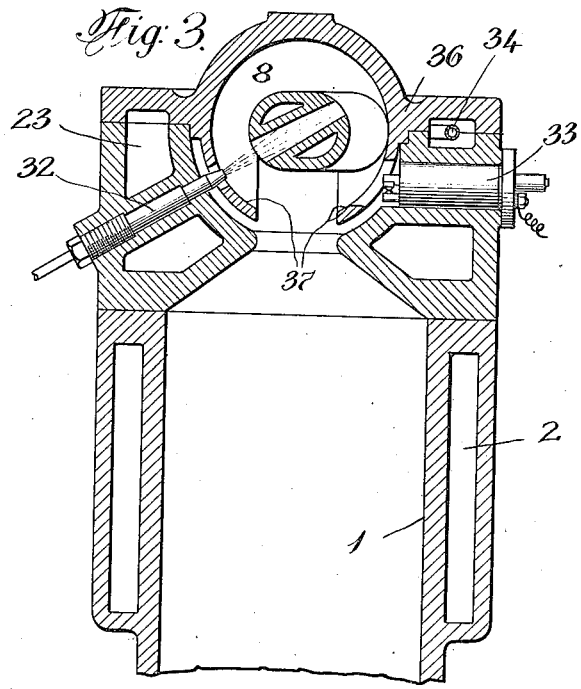
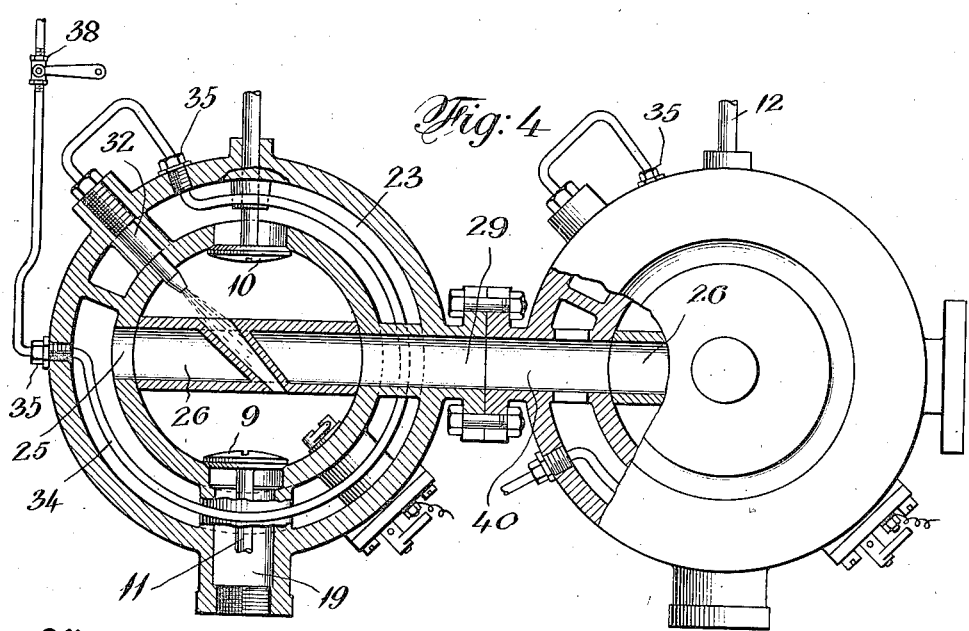

UNITED STATES PATENT OFFICE.

MARIO CARBONE, OF NEW YORK, N. Y.

INTERNAL-COMBUSTION ENGINE.

1,205,158. Specification of Letters Patent. Patented Nov. 21, 1916.

Application filed November 11, 1913. Serial No. 800,276.

*To all whom it may concern:*

Be it known that I, MARIO CARBONE, residing at New York, in the county of New York and State of New York, have invented certain new and useful Improvements in Internal-Combustion Engines, of which the following is a specification.

This invention relates to an internal combustion engine, and a particular object thereof is to provide an engine constructed so as to operate upon the consumption of the relatively heavier oils.

A more detailed object is to provide an engine constructed so as to consume a relatively lighter oil in its initial explosions and to provide portions to be heated in consequence of the initial explosions and adapted to serve as ignition means for the relatively heavier oil subsequently injected.

A further object is to provide an engine comprising a combustion chamber, and to provide means for conducting the heated products of combustion into contact with the exterior surface of the wall of said combustion chamber.

A further object is to provide an ignition member within the combustion chamber, and to provide means for conducting the heated products of combustion from the exterior of the combustion chamber into contact with said ignition member for heating said ignition member.

A further object is to provide a fuel tube or passage leading into said combustion chamber, and to provide means for heating said fuel tube.

A further object is to provide an engine comprising a combustion chamber, to provide a member extending transversely through the combustion chamber to be heated by the explosions in said combustion chamber, to provide an ignition tube extending through said member, to provide an injector adapted for projecting combustible fluid into and through said ignition tube from one end, and to provide a spark producing device adjacent the other end of said tube adapted to ignite the combustible fluid emerging from said tube when the tube is insufficiently heated to ignite the combustible fluid.

A further object is to provide an exhaust outlet from said combustion chamber and to provide a passage-way more or less completely encircling the combustion chamber along which the heated exhaust gases must pass for heating the walls of said combustion chamber, and to provide a supply tube for the fuel injector extending about the combustion chamber within said passage-way and subject to the heat of the exhaust gases in said passage-way, so as to pre-heat the fuel being fed to said injector.

A further object is to arrange the structure so that the exhaust from one cylinder of a multi-cylinder engine will be introduced into the exhaust passage-way of one or more other cylinders, whereby to maintain uniform heat in said other cylinders and incidentally to provide a tortuous passage for the products of combustion whereby, in a degree, to muffle the sound of the explosions.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

Figure 2:
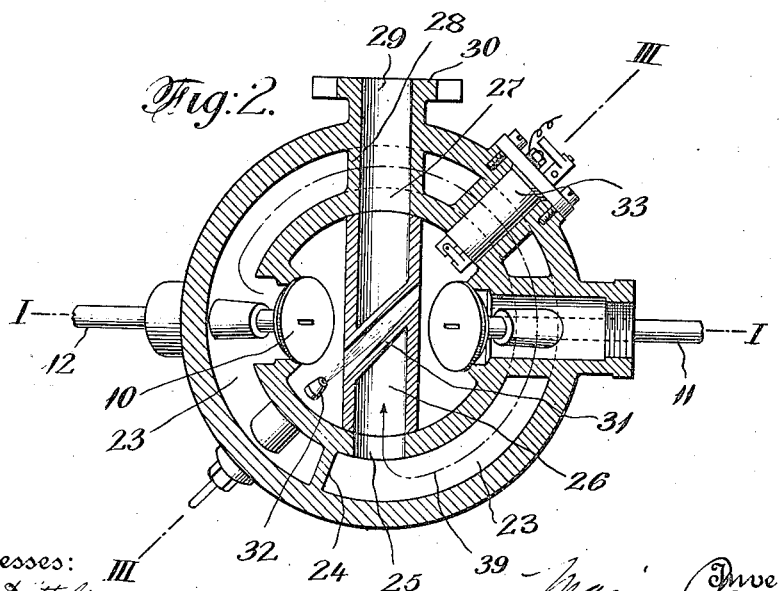

In the accompanying drawings which are to be taken as a part of this specification, and in which I have shown a merely preferred form of embodiment of the invention: Figure 1 is a vertical central sectional view of a portion of an engine constructed in accordance with the provisions of this invention, said section being taken substantially on the plane of line I—I of Fig. 2; Fig. 2 is a horizontal sectional view taken substantially on the plane of line II—II of Fig. 1; Fig. 3 is a view similar to Fig. 1, but being taken substantially on the plane of line III—III of Fig. 2; and Fig. 4 is a schematic sectional view partly in elevation for illustrating the relative positions of the parts, said section being taken substantially on the plane of line IV—IV of Fig. 1. In this view a pair of cylinders, as in a multi-cylinder engine, are illustrated in assembled relation.

Referring to the drawings for a detailed description of the structure illustrated, the reference numeral 1 indicates the cylinder of the engine provided with the usual water jacket 2. Within the cylinder moves the usual reciprocating plunger 3 preferably having a conical head 4. Upon the upper end of the cylinder 1, and secured thereto in a suitable manner, is a casting 5 formed with a conical depression 6 in its under surface registering with the bore of the cylinder 1 for accommodating the conical head 4 of the piston 3. Above the depression 6, and communicating therewith through a central opening 7, is a combustion chamber 8. This chamber is preferably globular, as illustrated, and the inlet and exhaust valves 9 and 10, respectively, rest in seats opening through the walls thereof above the opening 7 in opposed relation. These valves are fitted with stems 11 and 12 respectively, projecting through suitable guides formed in the casting 5, and springs 13 and 14, respectively, normally maintain said valves closed. A pair of rock shafts 15, 16, operated in any suitable or well known manner from the crank shaft of the engine, are provided with arms 17, 18, respectively, extending into operative relation with the projecting ends of the valve stems 11 and 12, respectively, whereby upon the properly timed oscillatory movements of the rock shafts, the valve 9 will be opened to admit air, or air and gas, as later described, and the valve 10 will open to permit exhaust of the combusted gases from the combustion chamber.

The seat of the inlet valve 9 communicates with a passage 19 into which the supply opening of a carbureter 20 is fitted. A supply pipe 21 for light oil, such as gasolene, communicates with the carbureter in the usual way, and a valve 22 controls said pipe.

The movement of the parts is, of course, timed so that the inlet valve 9 will open while the piston 3 is descending. The suction thus created will draw, through the passage 19, air and gas from the carbureter 20 into the combustion chamber. In case the valve 22 in the oil pipe 21 is closed so that no oil will be fed to the carbureter, then only a supply of pure air will be drawn in through the inlet opening.

The seat of the exhaust valve communicates with a passage-way 23 formed as an annular space substantially entirely encircling the combustion chamber, the casting 5 being formed with a double wall, after the manner of an ordinary water jacket construction, for forming said passage. At one point in the passage 23, at one side of the exhaust valve, is a division wall 24. An aperture 25 is formed through the inner wall of the casting 5 at the side of said division wall opposite the exhaust valve, and, extending transversely across the combustion chamber, is a tubular member 26 having one of its ends registering with the aperture 25, and having its other end registering with an aperture 27, formed in the diametrically opposite wall of the combustion chamber and communicating with a tube-like portion 28 preferably cast integrally with the casting 5, and comprising a final exhaust opening 29 from the cylinder. Suitable flange 30 may be formed upon the end of the tubular part 28 exteriorly of the cylinder for connecting the cylinder to a second cylinder, as shown in Fig. 4 if desired.

The movement of the part is so times that the valve 10 will open when the piston 3 is moving upward, and the exploded gases will therefore be forced out of the valve opening into the passage-way 23. They will follow the passage-way 23 almost entirely around the combustion chamber, enter the aperture 25, pass through the tubular member 26 and out through the final exhaust opening 29.

The inlet passage 19 is formed as a tubular part preferably cast integrally with the casting 5, and extending through the passage-way 23, in such manner that the heated products of combustion circling around such passage will contact with said tubular part and serve to heat the passage 19 to a high degree, and thereby pre-heat the air, or air and light gas, as the case may be, entering through said passage.

Extending transversely, and preferably diagonally, through the member 26 is a tubular part 31, which may be cast integrally with the member 26, the aperture through the member 31 being continued through the opposite walls of the member 26, so that the member 31 will constitute an ignition tube; said ignition tube 31 is in the direct path of the heated gases passing through the member 26, and is of such size as to provide ample space between its outer surface and the inner surface of the member 26 for the passage of said gases. The central longitudinal axis of the ignition tube 31 is in axial alinement with an injector 32, and may be preferably tapered so as to present a relatively larger opening at the end next said injector than at its other end.

The sparking device 33 projects into the combustion chamber in proximity to the smaller end of the ignition tube 31. This sparking device may be of any suitable or preferred construction either of the make and break type or of the jump type.

The feeding tube 34 for the injector 32, is disposed with a portion of its length within the passage-way 23 extending substantially throughout the length of said passage-way and subject to the heat generated therein by the exhausting gases. Suitable stuffing boxes 35 are provided through the outer wall of the casting 5 where the tube 34 enters and leaves the passage-way 23. A valve 38 may be arranged for controlling a supply of oil in the pipe 34.

The casting 5 may be formed of two parts, if desired, to facilitate cleaning, etc., in this instance the top part, as 36, in Fig. 3, will be separately formed and bolted or otherwise properly secured to the upper surface of the main portion of the casting. As shown, also in Fig. 3, the top portion 36, may, if desired, be formed with a part 37 comprising false walls within the combustion chamber spaced from the inner surface of the main portion of the casting 5, so as to provide a better circulation of the gases within the combustion chamber.

In operation, to start the action of the engine, the valve 22 being opened, the retreating piston will suck in a combustible mixture of light oil, from pipe 21, and air, through the passage 19 and valve 9 into the combustion chamber. The returning piston will then compress the combustible charge, and the sparking device 33 will operate to explode the charge to drive the piston out. Presuming the engine to be a 4-cycle engine, the exhaust valve 10 will then open and the combusted gases will be driven into the passage-way 23 by the returning piston, and will be caused to travel along said passage-way around the combustion chamber and into the opening 25, as indicated by arrow 39, in Fig. 2, thence through the tubular member 26, and out of the exhaust opening 29. The retreating piston will then suck in a new charge from pipe 21 and carbureter 20, and this new charge will be exploded by the sparking device when the piston again returns. These operations are common to all 4-cycle engines, and after being repeated for a few times, the walls of the combustion chamber will become heated by the presence of the heated gases both within and without the chamber. The passage-way 19 will become heated. The tubular member 26, being in the very midst of the explosions and being subject also to the heat of the gases exhausting through it, will be more quickly heated than the walls of the chamber. The ignition tube 31, extending through the member 26 will naturally heat very quickly, and will maintain a high and uniform temperature.

After the parts have been heated by the explosions as above, the valve 22 may be closed and the valve 38 in the pipe 34 may be opened, and a quantity of the relatively heavy oil be allowed to pass to the injector 32. In its passage through that portion of the pipe 34 which lies within the exhaust opening 23, the heavy oil will be more or less vaporized and will pass from the injector into the ignition tube 31 in a vaporized state. The vaporized oil from the injector will mingle with the supply of fresh heated air drawn in from the carbureter through the passage 19 and will form therewith a combustible gas, the quality of which may be determined by the amount of oil injected in proportion to the air opening of the carbureter.

The operation of the parts is so timed that the oil from the injector will be admitted preferably just as the piston reaches its extreme upward stroke in compressing the charge of pure air, which was drawn in on the preceding down stroke. The pressure thus generated by the piston, in the presence of the heated member 26 and ignition tube 31, will be sufficient to cause the ignition of the charge in a well known manner. The sparking device 33 may be caused to continue its operation for a while, if desired, until the parts are fully and completely heated, and thus avoid necessity for prolonged operation with the consumption of the light oil. The feeding of light oil may be discontinued as soon as the exhaust passage 23 is sufficiently heated to vaporize heavy oil in the pipe 34 therein. The sparking device may be disconnected entirely, however, as soon as the ignition tube 31 is sufficiently heated.

In a multiple-cylinder engine, the exhaust from one cylinder may be admitted into and through the tubular member 26 of the next adjacent, and other subsequent, cylinders, as indicated in Fig. 4 of the drawings, wherein the second cylinder of the engine is shown to have a passage-way 40 communicating with the exhaust 29 of the first cylinder. In this way, all of the cylinders will be maintained at a high and uniform temperature, and the time elapsing between explosions in one cylinder, and tending to permit cooling of the ignition tube, will be compensated for by the heat from the exhaust of the other cylinders.

Here it may be noted that the valve 38 is intended merely to represent a mechanism for controlling a supply of oil to the injector, and that this mechanism is intended to be operated automatically from the crank shaft of the engine for charging the injector at the prescribed times during the operation of the engine.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense. It is also to be understood that the language used in the following claims is intended to cover all of the generic and specific features of the invention herein described and all statements of the scope of the invention, which as a matter of language, might be said to fall therebetween.

Having thus described my invention, what I claim as new and desire to secure by Letters Patent, is:—

1. An internal combustion engine formed with a combustion chamber having a passage-way in the wall thereof encircling the combustion chamber, means for introducing heated products of combustion into said passage-way, and a fuel supply extending through said passage-way for the purpose set forth.

2. An internal combustion engine comprising a combustion chamber having a passage-way in the wall thereof encircling the combustion chamber, the wall of said combustion chamber being formed with an aperture through which the products of combustion from said combustion chamber may enter said passage-way, and being formed with a second aperture spaced from said first aperture through which said products of combustion may leave the space between said walls.

3. An internal combustion engine formed with a combustion chamber, a tubular member extending transversely through said combustion chamber, an ignition tube extending transversely through said tubular member, and means for introducing heated products of combustion into said tubular member and around said ignition tube to heat said ignition tube.

4. An internal combustion engine comprising a combustion chamber formed with an exhaust opening through the wall thereof, an ignition member within said combustion chamber, and means forming a passage-way from said exhaust opening through a passage-way formed in the wall of the combustion chamber encircling said combustion chamber to said ignition means for conducting the heated products of combustion to heat said ignition means.

5. An internal combustion engine comprising a combustion chamber having an exhaust opening through the wall thereof, a tubular member extending transversely through said combustion chamber, an ignition member carried by said tubular member, and means forming a passage-way for conducting the heated products of combustion from said exhaust opening into said tubular member for heating said ignition member.

6. An internal combustion engine comprising a combustion chamber having an exhaust opening through the wall thereof, a tubular member extending transversely through said combustion chamber, an ignition tube extending transversely through said tubular member, and means forming a passage-way for conducting the heated products of combustion from said exhaust opening into said tubular member for heating said ignition tube.

7. An internal combustion engine comprising a combustion chamber having an exhaust opening through the wall thereof, an ignition member within said combustion chamber, and the wall of said combustion chamber being formed with a passage-way encircling said combustion chamber extending from said exhaust opening to said ignition member conducting the heated products of combustion from said exhaust opening to said ignition member to heat said ignition member.

8. An internal combustion engine comprising a combustion chamber, the wall of said combustion chamber being formed with an annular closed passage-way encircling said combustion chamber, a partition in said passage-way, the wall of said combustion chamber being formed with an opening communicating between said combustion chamber and said passage-way at one side of said partition, and with an opening communicating between said passage-way and the atmosphere at the other side of said partition, for the purpose set forth.

9. An internal combustion engine comprising a combustion chamber, the wall of said combustion chamber being formed with an annular closed passage-way encircling said combustion chamber, a partition in said passage-way, the wall of the combustion chamber being formed with an opening communicating between said combustion chamber and said passage-way at one side of said partition, a tubular member extending transversely through the combustion chamber communicating with the atmosphere at one end and having its other end communicating with said passage-way at the other side of said partition.

10. An internal combustion engine comprising a combustion chamber, the wall of said combustion chamber being formed with an annular closed passage-way encircling said combustion chamber, a partition in said passage-way, the wall of the combustion chamber being formed with an opening communicating between said combustion chamber and said passage-way at one side of said partition, a tubular member extending transversely through the combustion chamber communicating with the atmosphere at one end and having its other end communicating with said passage-way at the other side of said partition, and an ignition member carried by said tubular member within said combustion chamber.

11. An internal combustion engine comprising a combustion chamber, the wall of said combustion chamber being formed with an annular closed passage-way encircling said combustion chamber, a partition in said passage-way, the wall of the combustion chamber being formed with an opening communicating between said combustion chamber and said passage-way at one side of said partition, a tubular member extending transversely through the combustion chamber communicating with the atmosphere at one end and having its other end communicating with said passage-way at the other side of said partition, an ignition member carried by said tubular member within said combustion chamber, and an injector extending through the wall of said combustion chamber adjacent said ignition member.

12. An internal combustion engine comprising a combustion chamber formed with an exhaust opening through the wall thereof, an ignition member within said combustion chamber, means comprising a passage-way for conducting the heated products of combustion from said exhaust opening into contact with said ignition means for heating said ignition means, said passage-way being formed in the wall of the combustion chamber and being disposed to encircle the combustion chamber, an injector disposed for injecting fuel upon said heated ignition means, a fuel supply pipe for said injector extending through said passage-way subject to the heat of the products of combustion therein.

13. An internal combustion engine, formed with a combustion chamber having a passage-way in the wall thereof encircling the combustion chamber, the wall of the combustion chamber having an opening therethrough through which the heated products of combustion may pass from the combustion chamber into said passage-way, a tubular ignition member disposed within the combustion chamber, a tubular extension from said passage way for leading the heated products of combustion from said passage-way to and around said tubular ignition member, a fuel injector carried by the wall of the combustion chamber in axial alinement with the longitudinal axis of the tubular ignition member for projecting fuel into said ignition member from one end of the ignition member, and a fuel supply pipe extending through said passage-way subject to the heat thereof and communicating with said injector.

14. An internal combustion engine formed with a combustion chamber having a passage-way in the wall thereof encircling the combustion chamber, the wall of the combustion chamber having an opening therethrough through which the heated products of combustion may pass from the combustion chamber into said passage-way, a tubular ignition member disposed within the combustion chamber, a tubular extension from said passage-way for leading the heated products of combustion from said passage-way to and around said tubular ignition member, a fuel injector carried by the wall of the combustion chamber in axial alinement with the longitudinal axis of the tubular ignition member for projecting fuel into said ignition member from one end of the ignition member, and a fuel supply pipe extending through said passage way subject to the heat thereof and communicating with said injector, the ignition member being of decreasing diameter away from the injector.

In testimony whereof I affix my signature in the presence of two witnesses.

MARIO CARBONE.

Witnesses:
LEO M. EISENBERG,
L. GUSFORD HANDY.